United States Patent
Sakata et al.

(10) Patent No.: US 6,572,791 B2
(45) Date of Patent: Jun. 3, 2003

(54) ELECTROCONDUCTIVE ELASTIC MEMBER, ELASTIC MEMBER AND IMAGE FORMATION EQUIPMENT

(75) Inventors: Junji Sakata, Tokyo (JP); Hirotaka Yamazaki, Tokyo (JP); Tadashi Nakajima, Tokyo (JP); Takahiro Kawagoe, Saitama-ken (JP)

(73) Assignee: Bridgestone Corporation, Tokyo (JP)

( * ) Notice: Subject to any disclaimer, the term of this patent is extended or adjusted under 35 U.S.C. 154(b) by 217 days.

(21) Appl. No.: 09/730,777

(22) Filed: Dec. 7, 2000

(65) Prior Publication Data

US 2001/0003757 A1 Jun. 14, 2001

(30) Foreign Application Priority Data

Dec. 10, 1999 (JP) .............................. 11-351498
Feb. 10, 2000 (JP) .......................... 2000-33068
May 31, 2000 (JP) ........................ 2000-162329
May 31, 2000 (JP) ........................ 2000-162330

(51) Int. Cl.$^7$ ............................ H01B 1/00; H01B 1/20; G03G 15/08; G03G 15/02; C08G 18/08; A45D 40/00

(52) U.S. Cl. ........................ 252/511; 252/502; 252/511; 521/112; 521/129; 521/137; 521/159; 521/174; 521/176; 355/25; 493/960; 206/823; 510/144

(58) Field of Search ................................ 252/502, 511; 521/112, 129, 137, 159, 174, 176; 355/25; 493/960; 206/823; 570/144

(56) References Cited

U.S. PATENT DOCUMENTS 3,928,138 A  12/1975  Wood et al.
4,302,552 A * 11/1981  Hongu et al. ................ 248/634
4,883,825 A * 11/1989  Westfall et al. .............. 399/284
5,082,870 A    1/1992  Fukuda et al.
5,177,119 A *  1/1993  Motte .......................... 521/159
5,192,812 A *  3/1993  Farris et al. ................... 516/13
5,565,968 A * 10/1996  Sawa et al. .................. 521/112
5,650,450 A *  7/1997  Lovette et al. .............. 521/112

FOREIGN PATENT DOCUMENTS

JP     49-69794     7/1974
JP     61-2086      3/1980
JP     2-228357     9/1990
JP     10-251426    9/1998

* cited by examiner

*Primary Examiner*—Mark Kopec
*Assistant Examiner*—Kallambella M Vijayakumar
(74) *Attorney, Agent, or Firm*—Oblon, Spivak, McClelland, Maier & Neustadt, P.C.

(57) ABSTRACT

There is disclosed an elastic member constituted of polyurethane foam obtained by agitationally mixing with water, a urethane prepolymer synthesized from a polyol and a polyisocyanate, characterized by simultaneously employing as polyols, a (A) polymer polyol synthesized from a polyether polyol as a basis, comprising at least 70% by weight of oxypropylene moiety; and a (B) hydrophilic polyether polyol comprising at least 50% by weight of oxyethylene moiety, or simultaneously employing as polyols, the component (A), the component (B) and a (C) polyether polyol comprising at least 70% by weight of oxypropylene moiety. The above elastic member is simultaneously imparted with excellent characteristics such as low hardness, fine cells, low residual compressive strain, high strength and the like. The polyurethane foam which constitutes the elastic member can be produced by free foaming. The electroconductive elastic member which is produced by using an aqueous dispersion of carbon instead of water is imparted with low electric resistance in addition to the above excellent characteristics.

19 Claims, No Drawings

ELECTROCONDUCTIVE ELASTIC MEMBER, ELASTIC MEMBER AND IMAGE FORMATION EQUIPMENT

BACKGROUND OF THE INVENTION

1. Field of the Invention

The present invention relates to an elastic member which is used in image formation equipment such as electrophotographic equipment, electrostatic recording equipment and toner flying recording equipment. More particularly, the present invention is concerned with an elastic member which is simultaneously imparted with excellent characteristics such as low hardness, fine cells, low residual compressive strain, high strength and the like; with image formation equipment equipped with the elastic member; and with toiletries such as a puffing material, a sponge and a scrubbing brush, and a bathing product each being composed of the polyurethane foam which constitutes the above-mentioned elastic member.

In addition, the present invention relates to an electroconductive elastic member which is used in image formation equipment such as electrophotographic equipment, electrostatic recording equipment and toner flying recording equipment. More particularly, the present invention pertains to an electroconductive elastic member which is simultaneously imparted with excellent characteristics such as low electric resistance, low hardness, fine cells, low residual compressive strain, high strength and the like; with image formation equipment equipped with the electroconductive elastic member.

2. Description of the Related Arts

In recent years, accompanying the advancement of electro-photographic technique, attention is paid to an intermediate-resistance elastic roller as a transfer member for dry electro-photographic equipment, a toner feeding member, an electrifying member and the like. Thus, there are used a transfer roller, a developing roller, a toner feeding roller, an electrifying roller and the like. Incidentally, there have heretofore been employed a high molecular elastomer and high molecular foam each having rubbery elasticity as a material constituting the aforesaid intermediate-resistance elastic roller.

Examples of the members which have hitherto been employed for the above-mentioned purpose include such elastomer or foam as NBR, EPDM, silicone rubber, polyurethane and the like, and as required, an electroconductive carbon such as carbon black, a metal oxide and a member imparted with electroconductivity with an ionic electroconductive agent or the like.

Of the elastomer or foam, polyurethane is preferably used in the above-mentioned member, since polyurethane can be made into a low hardness member well suited for the above-mentioned member, and can be made into a low hardness foam by a method using such a foaming agent as water and a compound having a low boiling point, a mechanical agitation method or the like method. It is possible to lower the hardness of polyurethane foam by selecting a material which determines the chemical constitution of polyurethane and its blending amount.

In the case where polyurethane foam is brought into usage in a member for image formation equipment such as a toner feeding roller, the foam is required to have a low hardness, a low resistance, fine cells, a low residual compressive strain, a high tensile strength, and to be inexpensive. Since in such usage, different electric resistances are required for elastic members according to the types and kinds of toners (developing agent) and developing members and the conditions on electric power source, elastic members having from a low resistance to a high resistance are manufactured and used by adding at need or without adding the electroconductive agent as mentioned hereinbefore.

There has heretofore been employed as the aforesaid elastic member, ester base polyurethane foam capable of easily achieving relatively fine cells by means of free foaming. However, the ester base polyurethane foam has been problematical in its liability to hydrolysis because of being ester base. On the other hand, ether base polyurethane foam which is not hydrolyzed is liable to form coarse cells by free foaming, necessitating pressurized mold foaming for the purpose of forming fine cells.

Moreover, the above-mentioned ester base polyurethane foam is in use also as a toiletry and a bathing product. However, the problem of durability has been raised in a puffing material for toiletry and a scrubbing brush for bathing each being composed of conventional polyurethane foam because of their liability to hydrolysis, whereby improvement of the polyurethane foam has been desired.

On the one hand, in the case of imparting electroconductivity to conventional polyurethane foam, it is necessary to add a large amount of electroconductive carbon thereto, since the electric resistance thereof is not sufficiently lowered even by the addition of an ionic electroconductive agent. Nevertheless, when a large amount of electroconductive carbon is added to the starting materials of polyurethane foam such as polyol, isocyanate, prepolymer and the like, there are brought up such problems as increasing the viscosity of the starting materials containing the electroconductive carbon added and dispersed, making it impossible to sufficiently mix or agitate the starting materials, as producing polyurethane foam having unfavorably coarse cells, and as making electric resistance less prone to be lowered.

In order to solve the above-mentioned problems, there is proposed a method for producing electroconductive polyurethane foam by mixing urethane prepolymer with water-dispersed carbon, a catalyst, a foam stabilizer and the like, and subjecting the resultant mixture to foaming with water.

There is proposed, for instance, as the above-mentioned method, a method which comprises mixedly reacting a hydrophilic prepolymer with an aqueous dispersion containing fine particles of electroconductive carbon under the conditions of chemical equivalent and excess of water, said prepolymer being produced by reacting an isocyanate with polyoxyethylene/polyoxypropylene copolymer made into a polyether polyol having a polyoxyethylene content of 60 to 100% by weight {Japanese Patent Application Laid-Open No. 69794/1974 (Showa-49) and Japanese Patent Publication No. 2086/1986 (Showa-61)}. The electroconductive polyurethane foam obtained by this method, although having a low resistance and fine cells, involves such problems as liability to shrinkage after foaming, high residual compressive strain and the like.

Likewise, there is proposed a method which comprises mixedly reacting a hydrophilic prepolymer with an aqueous dispersion containing fine particles of electroconductive carbon under the conditions of chemical equivalent and excess of water, said prepolymer being produced by reacting an isocyanate with oxyethylene/oxypropylene copolymer made into a polyether polyol having a polyoxyethylene content of at most 30% by weight (Japanese Patent Application Laid-Open Nos.228357/1990 (Heisei-2) and 251426/

1998 (Heisei-10). The aforesaid method involves such problems that electroconductive polyurethane foam produced by free foaming under atmospheric pressure unfavorably increases cell size and causes liability to crack and roughness of the resultant cells.

SUMMARY OF THE INVENTION

It is an object of the invention to solve the problems with conventional elastic members and at the same time, to provide an elastic member constituted of polyurethane foam which is simultaneously imparted with excellent characteristics such as low hardness, fine cells, low residual compressive strain, high strength and the like, and also provide a toiletry and a bathing product each being composed of this polyurethane foam.

It is another object of the invention to solve the problems with conventional electroconductive elastic members and at the same time, to provide an electroconductive elastic member constituted of polyurethane foam which is simultaneously imparted with excellent characteristics such as low electric resistance, low hardness, fine cells, low residual compressive strain, high strength and the like.

Other object of the invention will be obvious from the text of this specification hereinafter disclosed.

In such circumstances, intensive extensive research and investigation were accumulated by the present inventors on a process for producing polyurethane foam having fine cells in the case where polyurethane foam is produced by agitationally mixing with water, a urethane prepolymer which has been synthesized from a polyol and a polyisocyanate, followed by water foaming. As a result, it has been found that an elastic member constituted of polyurethane foam having the foregoing excellent characteristics is obtainable by simultaneously employing as polyols, a specific polymer polyol, a specific hydrophilic polyether polyol and a polyether polyol having a high content of oxypropylene moiety. Specifically, the use of a hydrophilic polyol alone gives rise to polyurethane foam which has fine cells but has a large number of closed cells on account of high activity of the hydrophilic polyol rich in polyoxyethylene chains, thereby making it impossible to produce normal and regular polyurethane foam free from shrinkage in the case of free foaming. It being so, various investigations were made by the present inventors on a process for producing proper polyurethane foam free from shrinkage. As a result, there have been found that polyurethane foam which has uniform fine cells but is free from shrinkage in spite of closed cell is obtainable by simultaneously employing a specific polymer polyol and a specific hydrophilic polyol; that polyurethane foam having more excellent characteristics is obtainable by further employing a specific polyether polyol along with the above two components; that an elastic member constituted of the above-mentioned polyurethane foam is well suited as a member to be mounted on image formation equipment; and further that the polyurethane foam is well suited as a material for toiletries and bathing products.

Furthermore, intensive extensive research and investigation were accumulated by the present inventors on a process for producing polyurethane foam having fine cells in the case where polyurethane foam is produced by agitationally mixing a urethane prepolymer which has been synthesized from a polyol and a polyisocyanate with an aqueous dispersion of carbon, followed by water foaming. As a result, it has been found that polyurethane foam having further excellent characteristics is obtainable by employing the constitution same as the foregoing, and an electroconductive elastic member constituted of the above-mentioned polyurethane foam is well suited as a member to be mounted on image formation equipment. The present invention has been accomplished by the foregoing findings and information.

Specifically, the present invention provides an elastic member constituted of polyurethane foam obtained by agitationally mixing with water, a urethane prepolymer synthesized from a polyol and a polyisocyanate, characterized by simultaneously employing as the polyol, a (A) polymer polyol synthesized from a polyether polyol as a basis, comprising at least 70% by weight of oxypropylene moiety; and a (B) hydrophilic polyether polyol comprising at least 50% by weight of oxyethylene moiety, or simultaneously employing as the polyol, a (A) polymer polyol synthesized from a polyether polyol as a basis, comprising at least 70% by weight of oxypropylene moiety; a (B) hydrophilic polyether polyol comprising at least 50% by weight of oxyethylene moiety; and a (C) polyether polyol comprising at least 70% by weight of oxypropylene moiety; and also provides image formation equipment equipped with the aforesaid elastic member as well as a toiletries and a bathing product each being composed of the above-mentioned ether based polyurethane foam.

In addition, the present invention provides an electroconductive elastic member constituted of polyurethane foam obtained by agitationally mixing with an aqueous dispersion of carbon, a urethane prepolymer synthesized from a polyol and a polyisocyanate, characterized by simultaneously employing as the polyol, a (A) polymer polyol synthesized from a polyether polyol as a basis, comprising at least 70% by weight of oxypropylene moiety ; and a (B) hydrophilic polyether polyol comprising at least 50% by weight of oxyethylene moiety, or simultaneously employing as the polyol, a (A) polymer polyol synthesized from a polyether polyol as a basis, comprising at least 70% by weight of oxypropylene moiety; a (B) hydrophilic polyether polyol comprising at least 50% by weight of oxyethylene moiety; and a (C) polyether polyol comprising at least 70% by weight of oxypropylene moiety; and also provides image formation equipment equipped with the aforesaid electroconductive elastic member.

DESCRIPTION OF PREFERRED EMBODIMENT

In the present invention, the polymer polyol (A) is a polymer polyol synthesized from a polyether polyol as a basis, comprising at least 70% by weight of oxypropylene moiety, and is formed by dispersing in a polyether polyol, fine particles of a polymer polymerized from an other monomer, for instance, a monomer having an ethylenically unsaturated double bond, preferably acrylonitrile, styrene or the like. The polymer polyol (A) has an oxypropylene moiety content in the range of preferably 70 to 100% by weight, particularly preferably 80 to 100% by weight. The above-mentioned polyether polyol is formed by subjecting propylene oxide and ethylene oxide to addition polymerization onto a polymerization initiator such as glycerol, trimethylolpropane, ethylene glycol, propylene glycol, pentaerythritol and sorbitol. The polymer polyol (A) has the number of functional groups in the range of preferably 2 to 6, particularly preferably 2.5 to 4 and a weight average molecular weight in the range of preferably 2000 to 6000 particularly preferably 2500 to 5000. The polymer component (solid content) contained in the polymer polyol is in the range of preferably 15 to 45% by weight, particularly preferably 20 to 40% by weight. The monomer which constitutes the polymer is exemplified by, for instance, a monomer having an ethylenically unsaturated double bond, specifically preferably by acrylonitrile, styrene and the like, and melamine in addition thereto. It is preferable that the polymer component is acrylonitrile homopolymer or acrylonitrile/styrene copolymer.

The hydrophilic polyether polyol (B) mentioned hereinbefore is a hydrophilic polyether polyol comprising at least 50% by weight of oxyethylene moiety, and formed by subjecting propylene oxide and ethylene oxide to addition polymerization onto a polymerization initiator such as glycerol, trimethylolpropane, ethylene glycol, propylene glycol, pentaerythritol and sorbitol. The hydrophilic polyether polyol (B) has an oxyethylene moiety content of preferably at least 50% by weight, the number of functional groups in the range of preferably 2 to 6, particularly preferably 2.5 to 4 and a weight average molecular weight in the range of preferably 1500 to 6000 particularly preferably 2500 to 5000.

The polyether polyol (C) mentioned before is a polyether polyol comprising at least 70% by weight of oxyepropylene moiety, and is formed by subjecting propylene oxide and ethylene oxide to addition polymerization onto a polymerization initiator such as glycerol, trimethylolpropane, ethylene glycol, propylene glycol, pentaerythritol and sorbitol. The polyether polyol (C) has an oxypropylene moiety content in the range of preferably 80 to 100% by weight, the number of functional groups in the range of preferably 2 to 6, particularly preferably 2.5 to 4 and a weight average molecular weight in the range of preferably 1500 to 6000, particularly preferably 2500 to 5000.

Polyurethane foam having a different hardness is obtained by altering the mixing proportions among the above-mentioned polymer polyol (A), the hydrophilic polyether polyol (B) and the polyether polyol (C). With a view to lessen the residual compressive strain and minimize a dimensional variation, the mixing proportions among the polymer polyol (A), the hydrophilic polyether polyol (B) and the polyether polyol (C) are preferably set on 3 to 80% by weight of the polymer polyol (A), 20 to 60% by weight of the hydrophilic polyether polyol (B) and 0 to 60% by weight of the polyether polyol (C).

The blending amount of the polymer polyol (A), when being unreasonably large, results in excessively high hardness of the polyurethane foam to be produced, whereas the amount thereof, when being unreasonably small, brings about a failure to promote the communication of foam, thus causing liability to shrinkage of foam after foaming. The blending amount of the hydrophilic polyether polyol (B), when being unreasonably large, results in high residual compressive strain of the polyurethane foam to be produced and large dimensional variation depending upon the environmental conditions, whereas the amount thereof, when being unreasonably small, brings about enlarged cell size, thereby causing unsuitability for an electroconductive member which necessitates fine cells. The blending amount of the polyether polyol (C), when being unreasonably large, gives rise to such disadvantage as enlarged cell size.

In the present invention, there is no need for adding the polyether polyol (C), in the case where the objective physical properties such as hardness, the number of cells, electric resistance, residual compressive strain, tensile strength and the like are assured by the combined use of the two components of the polymer polyol (A) and the hydrophilic polyether polyol (B). In this case, it is particularly preferable to set the amounts of the polymer polyol (A) and the hydrophilic polyether polyol (B) on 60 to 75% by weight, and 25 to 40% by weight, respectively. In the case of simultaneously using the polymer polyol(A), the hydrophilic polyether polyol(B) and the polyether polyol(C), it is particularly preferable to set the amounts of the polymer polyol(A), the hydrophilic polyether polyol(B) and the polyether polyol(C) on 30 to 75% by weight, 25 to 40% by weight and 10 to 30% by weight, respectively. The use of the polyether polyol(C) along with the components (A) and (B) has the advantage of further easily assuring the objective physical properties such as hardness, the number of cells, electric resistance, residual compressive strain, tensile strength and the like.

With regard to the polyol to be used for the synthesis of the prepolymer in relation to the present invention, there may be properly used when necessary, polyether polyol, polyester polyol, polyisoprene polyol, polybutadiene polyol, hydrogenated polybutadiene or the like other than any of the three kinds of polyols in addition thereto to the extent that such usage does not impair the working effect of the present invention. The aforesaid polyether polyol is exemplified by tetramethylene glycol, polyethylene glycol, propanediol and butanediol. The aforesaid polyester polyol is exemplified by condensation base polyester polyol obtained by condensation reaction between a dicarboxylic acid and a diol or triol, lactone base polyester polyol obtained by ring opening polymerization using a diol or triol as a base and ester-modified polyol obtained by modifying an end of polyether polyol with lactone.

Regarding the polyisocyanate to be used for the synthesis of the prepolymer in relation to the present invention, there are preferably used polyisocyanate the isocyanate component of which is free from an unsaturated bond and is exemplified by tolylenediisocyanate (TDI), diphenylmethanediisocyanate (MDI), crude diphenylmethanediisocyanate (crude MDI), isophoronediisocyanate, hydrogenated diphenylmethanediisocyanate, hydrogenated tolylenediisocyanate and hexamethylenediisocyanate; any of the polyisocyanate modified with isocyanurate, carbodiimide, glycol or the like. Of these is particularly preferable TDI-80 which has the ratio by weight of 2,4-tolylenediisocyanate to 2,6-tolylenediisocyanate being 80/20. Further, the content of NCO group (isocyanate group) of the prepolymer in relation to the present invention is preferably 3 to 30% by weight, particularly preferably 5 to 15% by weight.

The aqueous dispersion of carbon to be used in the electroconductive member according to the present invention is formed by dispersing carbon black in water through a method in which a surfactant or a coupling agent is added to carbon black, a method in which carbon black is surface treated, or the like method. There is preferably used the aqueous dispersion which contains 2 to 40% by weight, particularly 5 to 20% by weight. As carbon black to be used herein, mention is made of gas black such as electrochemical black, ketchen black and acetylene black, oil furnace black containing ink black, thermal black, channel black and lump black.

In the elastic member or electroconductive elastic member according to the present invention, the chemical equivalent ratio of NCO group in urethane prepolymer/OH group in water (water contained in aqueous dispersion of carbon in the case of electroconductive elastic member) is preferably 1/100 to 1/2, particularly preferably 2/100 to 10/100.

At the time of agitationally mixing urethane prepolymer and water in the the present invention, a foam stabilizer is added to the mixture in order to stabilize the cells of polyurethane foam. The foam stabilizer is preferably a polyether-modified silicone foam stabilizer in which the polyether moiety contains oxyethylene unit of at least 55% by weight, preferably at least 60% by weight. The blending amount of the silicone foam stabilizer is preferably 1 to 5 parts by weight based on 100 parts by weight of urethane prepolymer, particularly preferably 2 to 3 parts by weight based thereon.

Examples of the catalyst for the purpose of curing the polyurethane foam include monoamines such as triethylamine and dimethylcyclohexylamine; diamines such as tetramethylethylenediamine, tetramethylpropanediamine and tetramethylhexanediamine; triamines such as pentamethyldiethylenetriamine, pentamethyldipropylenetriamine and tetramethylguanidine; cyclic amines such as triethylenediamine, dimethylpiperazine, methylethylpiperazine, methylmorpholine and dimethylimidazole; alcoholamines such as dimethylaminoethanol, dimethylaminoethoxyethanol, trimethylaminoethylethanolamine, methylhydroxyethylpiperazine and hydroxyethylmorpholine; ether amines such as bis(dimethylaminoethyl) ether and ethylene glycol bis (dimethyl) aminopropyl ether; and organometal compounds such as stannous octoate, dibutyltin diacetate, dibutyltin dilaurate, dibutyltin mercaptide, dibutyltin thiocarboxylate, dibutyltin dimaleate, dioctyltin mercaptide, dioctyltin thiocarboxylate, phenylmercury propionate and lead octenate. Of these, the organotin compounds as a catalyst are particularly preferable. Any of the catalysts may be used alone or in combination with at least with one other.

Moreover, at the time of agitationally mixing urethane prepolymer and water in the the present invention, any of other additives may be added at need to the mixture, including a flame retardant, an improver for punching/cutting/processing properties, an organic filler and an inorganic filler.

The elastic member according to the present invention may be in the form of any of various forms. The elastic member, when being in the form of roller, has a logarithmic value of roller resistance ($\Omega$), that is, {log $\Omega$} of at least 9.0, preferably at least 10.0; an Asker F hardness(degrees) in the range of preferably 40 to 85, more preferably 40 to 70, particularly preferably 45 to 65; the number of cells per 25 mm length of polyurethane foam in the range of preferably 50 to 200, more preferably 50 to 120, particularly preferably 60 to 100; a residual compressive strain in the range of preferably 1 to 10%, more preferably 1 to 5%; a tensile strength in the range of preferably 0.15 to 0.50 MPa. The polyurethane foam has a density in the range of preferably 0.05 to 0.2 g/cm$^3$, more preferably 0.09 to 0.15/cm$^3$.

The elastic member according to the present invention is usable for a variety of purposes, particularly for a developer feeding member of image formation equipment and a transfer member of the same. The aforesaid member, when being in the form of roller, can be in such configuration in which polyurethane foam is formed around a metallic shaft. There are usable as a material for metallic shaft, galvanized steel such as galvanized sulfur free cutting steel, aluminum, stainless steel and phosphor bronze and the like material.

The ether base polyurethane foam of fine cells according to the present invention is preferably usable for toiletries such as a puffing material and bathing products such as a scrubbing brush.

On the one hand, the electroconductive elastic member according to the present invention may be in the form of any of various forms. The electroconductive elastic member, when being in the form of roller, has a logarithmic value of roller resistance ($\Omega$), that is, {log $\Omega$} in the range of preferably 3.0 to 6.0, particularly preferably 3.5 to 5.5; an Asker F hardness (degrees) in the range of preferably 40 to 85, more preferably 40 to 70, particularly preferably 45 to 65; the number of cells per 25 mm length of polyurethane foam in the range of preferably 50 to 200, more preferably 50 to 120, particularly preferably 60 to 100; a residual compressive strain in the range of preferably 1 to 10%, more preferably 1 to 5%; a tensile strength in the range of preferably 0.15 to 0.50 MPa. The polyurethane foam has a density in the range of preferably 0.05 to 0.2 g/cm$^3$, more preferably 0.09 to 0.15/cm$^3$.

The electroconductive elastic member according to the present invention is usable for a variety of purposes, in particular for a developer feeding member of image formation equipment and a transfer member of the same. The aforesaid member, when being in the form of roller, can be in such configuration in which polyurethane foam is formed around a metallic shaft. There are usable as a material for the metallic shaft, galvanized steel such as galvanized sulfur free cutting steel, aluminum, stainless steel and phosphor bronze and the like material.

In what follows, the present invention will be described in more detail with reference to comparative examples and working examples, which however shall never limit the present invention thereto.

Moreover, characteristic tests were effected on the rollers obtained in the working examples and comparative examples according to the following procedures.

(1) Density

Density was obtained by dividing the weight of polyurethane foam in the air by its volume.

(2) Number of Cells

The number of cells for the image was measured by photography at a magnification of 40 to 60 using a CCD camera manufactured by Hilock Co., Ltd. according to JIS K6402.

(3) Residual Compressive Strain

Residual compressive strain was measured according to JIS K6382.

(4) Tensile Strength

Tensile strength was measured according to JIS K6301.

(5) Resistance of Roller

The resistance of roller was measured by applying a load of 100 g onto each of a roller as a specimen so that it was pressed to a copper plate, while applying 100V voltage thereto and using a specific resistance meter R 8340A manufactured by Advantest Corporation.

EXAMPLE 1

Into an enclosable vessel were weighed 20 parts by weight of polymer polyol having about 28% by weight of solid content (acrylonitrile/styrene polymer) composed, as a base polyol, of polyether polyol which had a weight average molecular weight of 5000 and which had been produced by the addition to glycerol, of 15% by weight of ethylene oxide and 85% by weight of propylene oxide; 40 parts by weight of hydrophilic polyether polyol which had a weight average molecular weight of 3400 and which had been produced by the addition to glycerol, of 75% by weight of ethylene oxide and 25% by weight of propylene oxide; 40 parts by weight of polyether polyol which had a weight average molecular weight of 4800 and which had been produced by the addition to glycerol, of 15% by weight of ethylene oxide and 85% by weight of propylene oxide; and 21 parts by weight of tolylene diisocyanate (TDI-80). The vessel was closed with a lid and shaken, so that the content therein was sufficiently mixed. Thereafter, the vessel was placed in an oven at 60° C. of hot air circulation type, sometimes taken out from the oven, shaken to mix the content therein and heated for 48 hours to synthesize a prepolymer. The resultant prepolymer had an NCO content of 6.0% by weight.

Subsequently, by the use of a high speed mixer, a mixture was prepared by mixing 100 parts by weight of the resultant prepolymer and the mixture in a total weight of 25.1 parts by weight containing 0.1 part by weight of a solution in 70% by weight concentration of bis (dimethylaminoethyl) ether as the catalyst {manufactured by Kao Corporation under the trade name "Kaolizer No.12"} in dipropylene glycol and 2.5 parts by weight of reactive silicone as a foam stabilizer in which 70% by weight of ether chain consisted of polyoxyethylene, said solution and said foam stabilizer being dissolved in 22.5 parts by weight of water. The mixture thus obtained was poured in a foaming chamber without any lid measuring 300 mm×150 mm×50 mm in size, where it was foamed, and thereafter cured at 100° C. over a period of 15 minutes to prepare polyurethane foam. The foam thus obtained was cut into a piece measuring 28 mm×28 mm×240 mm in size by the use of a vertical cutter, and in the central part of the plane with 28 mm×28 mm in size, there was made a through hole having a diameter of 5.0 mm perpendicularly to the plane. Then a shaft of 6.0 mm in diameter which had been made of galvanized sulfur free cutting steel and wrapped with a hot melt sheet on the outside surface was inserted into the through hole. The foam with the shaft was heated for 70 minutes in an oven at 120° C. of hot air circulation type so as to adhere the shaft to the foam. The resultant shafted polyurethane foam was polished by the use of a polishing machine, and both the ends of the foam was cut off to prepare a polyurethane foam made roller having an outer diameter of 13.4 mm and a length of polyurethane foam portion of 217 mm.

The polyurethane foam portion of the resultant roller had a density of 0.102 g/cm$^3$, the number of cells per 25 mm length of the polyurethane foam being 113, a residual compressive strain of 3.4%, a tensile strength of 0.163 MPa, a roller resistance at 20° C. and at a relative humidity of 50% being $10^{10.55}$ Ω and an Asker F hardness of 49 degrees, whereby suitable characteristics were obtained in all respects.

The roller was integrated in a dry type electrophotographic apparatus to serve as a toner feeding roller, and allowed to stand under a low temperature low humidity condition (15° C. and 10%) and also under a high temperature high humidity condition (32.5° C. and 85%) each for 48 hours. Thereafter both white solid images and black solid images were printed. As a result, satisfactory images were obtained.

EXAMPLE 2

Into an enclosable vessel were weighed 40 parts by weight of polymer polyol having about 28% by weight of solid content (acrylonitrile/styrene polymer) composed, as a base polyol, of polyether polyol which had a weight average molecular weight of 5000 and which had been produced by the addition to glycerol, of 15% by weight of ethylene oxide and 85% by weight of propylene oxide; 60 parts by weight of hydrophilic polyether polyol which had a weight average molecular weight of 3400 and which had been produced by the addition to glycerol, of 75% by weight of ethylene oxide and 25% by weight of propylene oxide; and 21 parts by weight of tolylene diisocyanate (TDI-80). The vessel was closed with a lid and shaken, so that the content therein was sufficiently mixed. Thereafter, the vessel was placed in an oven at 60° C. of hot air circulation type, sometimes taken out from the oven, shaken to mix the content therein and heated for 48 hours to synthesize a prepolymer. The resultant prepolymer had an NCO content of 6.0% by weight.

Subsequently, by the use of a high speed mixer, a mixture was prepared by mixing 100 parts by weight of the resultant prepolymer and the mixture in a total weight of 25.1 parts by weight containing 0.1 part by weight of a solution in 70% by weight concentration of bis(dimethylaminoethyl) ether as the catalyst {manufactured by Kao Corporation under the trade name "Kaolizer No. 12"} in dipropylene glycol and 2.5 parts by weight of reactive silicone as a foam stabilizer in which 70% by weight of ether chain consisted of polyoxyethylene, said solution and foam stabilizer being dissolved in 22.5 parts by weight of water. The mixture thus obtained was poured in a foaming chamber without any lid measuring 300 mm×150 mm×50 mm in size, where it was foamed, and thereafter cured at 100° C. over a period of 15 minutes to prepare polyurethane foam. The foam thus obtained was processed in the same manner as in Example 1 to prepare a polyurethane foam made roller having an outer diameter of 13.4 mm and a length of polyurethane foam portion of 217 mm.

The polyurethane foam portion of the resultant roller had a density of 0.077 g/cm$^3$, the number of cells per 25 mm length of the polyurethane foam being 115, a residual compressive strain of 6.2%, a tensile strength of 0.175 MPa, a roller resistance at 20° C. and at a relative humidity of 50% being $10^{11.04}$ Ω and an Asker F hardness of 34 degrees, whereby suitable characteristics were obtained in all respects.

The roller was integrated in a dry type electrophotographic apparatus to serve as a toner feeding roller, and allowed to stand under a low temperature low humidity condition (15° C. and 10%) and also under a high temperature high humidity condition (32.5° C. and 85%) each for 48 hours. Thereafter both white solid images and black solid images were printed. As a result, satisfactory images were obtained.

EXAMPLE 3

By the use of the mixture same as that in Example 1, polyurethane foam was prepared through pressurized mold method. Specifically, by using a pressurized mold made of aluminum without a vent hole in which a rubbery packing was used on the ground portion between a top force and the bottom force, and the inner size was 50 mm×50 mm×300 mm, the above-mentioned mixture was poured in the pressurized mold where it was foamed, and thereafter cured at 100° C. over a period of 15 minutes to prepare polyurethane foam. The foam thus obtained was processed in the same manner as in Example 1 to prepare a polyurethane foam made roller having an outer diameter of 13.4 mm and a length of polyurethane foam portion of 217 mm.

The polyurethane foam portion of the resultant roller had a density of 1.33 g/cm$^3$, the number of cells per 25 mm length of the polyurethane foam being 158, a residual compressive strain of 8.3%, a tensile strength of 0.196 MPa, a roller resistance at 20° C. and at a relative humidity of 50% being $10^{10.40}$ Ω and an Asker F hardness of 72 degrees, whereby suitable characteristics were obtained in all respects.

The roller was integrated in a dry type electrophotographic apparatus to serve as a toner feeding roller, and allowed to stand under a low temperature low humidity condition (15° C. and 10%) and also under a high temperature high humidity condition (32.5° C. and 85%) each for 48 hours. Thereafter both white solid images and black solid images were printed. As a result, satisfactory images were obtained.

EXAMPLE 4

By the use of the mixture same as that in Example 2 in the same manner as in Example 3, polyurethane foam was prepared through pressurized mold method. The foam thus obtained was processed in the same manner as in Example 1 to prepare a polyurethane foam made roller having an outer diameter of 13.4 mm and a length of polyurethane foam portion of 217 mm.

The polyurethane foam portion of the resultant roller had a density of 1.11 g/cm$^3$, the number of cells per 25 mm length of the polyurethane foam being 186, a residual compressive strain of 8.9%, a tensile strength of 0.207 MPa, a roller resistance at 20° C. and at a relative humidity of 50% being $10^{10.88}$ Ω and an Asker F hardness of 60 degrees, whereby suitable characteristics were obtained in all respects.

The roller was integrated in a dry type electrophotographic apparatus to serve as a toner feeding roller, and allowed to stand under a low temperature low humidity condition (15° C. and 10%) and also under a high temperature high humidity condition 32.5° C. and 85%) each for 48 hours. Thereafter both white solid images and black solid images were printed. As a result, satisfactory images were obtained.

COMPARATIVE EXAMPLE 1

Into an enclosable vessel were weighed 100 parts by weight of polyether polyol which had a weight average molecular weight of 4800 and which had been produced by the addition to glycerol, of 15% by weight of ethylene oxide and 85% by weight of propylene oxide; and 22.2 parts by weight of tolylene diisocyanate (TDI-80). The vessel was closed with a lid and shaken, so that the content therein was sufficiently mixed. Thereafter, the vessel was placed in an oven at 60° C. of hot air circulation type, sometimes taken out from the oven, shaken to mix the content therein and heated for 48 hours to synthesize a prepolymer. The resultant prepolymer had an NCO content of 6.1% by weight.

Subsequently, by the use of a high speed mixer, a mixture was prepared by mixing 100 parts by weight of the resultant prepolymer and the mixture in a total weight of 25.1 parts by weight containing 0.1 part by weight of a solution in 70% by weight concentration of bis(dimethylaminoethyl) ether as the catalyst {manufactured by Kao Corporation under the trade name "Kaolizer No. 12"} in dipropylene glycol and 2.5 parts by weight of reactive silicone as a foam stabilizer in which 70% by weight of ether chain consisted of polyoxyethylene, said solution and said foam stabilizer being dissolved in 22.5 parts by weight of water. The mixture thus obtained was poured in a foaming chamber without any lid measuring 300 mm×300 mm×70 mm in size, where it was foamed, and thereafter cured at 100° C. over a period of 15 minutes to prepare polyurethane foam. The foam thus obtained was processed in the same manner as in Example 1 to prepare a polyurethane foam made roller having an outer diameter of 13.4 mm and a length of polyurethane foam portion of 217 mm.

The polyurethane foam portion of the resultant roller had a density of 0.091 g/cm$^3$, the number of cells per 25 mm length of the polyurethane foam being 79, a residual compressive strain of 6.9%, a tensile strength of 0.161 MPa, a roller resistance at 20° C. and at a relative humidity of 50% being $10^{11.76}$ Ω and an Asker F hardness of 55 degrees, in which the residual compressive strain was favorably low but the cell sizes were unreasonably large.

The roller was integrated in a dry type electrophotographic apparatus to serve as a toner feeding roller, and allowed to stand under a low temperature low humidity condition (15° C. and 10%) and also under a high temperature high humidity condition 32.5° C. and 85%) each for 48 hours. Thereafter both white solid images and black solid images were printed. As a result, there were generated uneven images presumably due to coarse cells in each of the conditions.

COMPARATIVE EXAMPLE 2

Into an enclosable vessel were weighed 100 parts by weight of hydrophilic polyether polyol which had a weight average molecular weight of 3400 and which had been produced by the addition to glycerol, of 75% by weight of ethylene oxide and 25% by weight of propylene oxide; and 23 parts by weight of tolylene diisocyanate (TDI-80). The vessel was closed with a lid and shaken, so that the content therein was sufficiently mixed. Thereafter, the vessel was placed in an oven at 60° C. of hot air circulation type, sometimes taken out from the oven, shaken to mix the content therein and heated for 48 hours to synthesize a prepolymer. The resultant prepolymer had an NCO content of 5.9% by weight.

Subsequently, by the use of a high speed mixer, a mixture was prepared by mixing 100 parts by weight of the resultant prepolymer and the mixture in a total weight of 25.1 parts by weight containing 0.1 part by weight of a solution in 70% by weight concentration of bis(dimethylaminoethyl) ether as the catalyst {manufactured by Kao Corporation under the trade name "Kaolizer No. 12"} in dipropylene glycol and 2.5 parts by weight of reactive silicone as a foam stabilizer in which 70% by weight of ether chain consisted of polyoxyethylene, said solution and said foam stabilizer being dissolved in 22.5 parts by weight of water. The mixture thus obtained was poured in a foaming chamber without any lid measuring 300 mm×150 mm×50 mm in size, where it was foamed, and thereafter cured at 100° C. over a period of 15 minutes to prepare polyurethane foam.

The resultant foam was overwhelmed by closed cells, and shrinked with the lapse of cooling time, causing deformation. In order to prevent the shrinkage, an attempt was made to carry out crushing of the foam with a result that crushing was impossible because of the overwhelming closed cells. The foam, when further strongly pressed, was finally broken making it impossible to obtain normal polyurethane foam which is usable for a roller.

COMPARATIVE EXAMPLE 3

Into an enclosable vessel were weighed 60 parts by weight of hydrophilic polyether polyol which had a weight average molecular weight of 3400 and which had been produced by the addition to glycerol, of 75% by weight of ethylene oxide and 25% by weight of propylene oxide; 40 parts by weight of polyether polyol which had a weight average molecular weight of 4800 and which had been produced by the addition to glycerol, of 15% by weight of ethylene oxide and 85% by weight of propylene oxide; and 23 parts by weight of tolylene diisocyanate (TDI-80). The vessel was closed with a lid and shaken, so that the content therein was sufficiently mixed. Thereafter, the vessel was placed in an oven at 60° C. of hot air circulation type, sometimes taken out from the oven, shaken to mix the content therein and heated for 48 hours to synthesize a prepolymer. The resultant prepolymer had an NCO content of 6.0% by weight.

Subsequently, by the use of a high speed mixer, a mixture was prepared by mixing 100 parts by weight of the resultant prepolymer and the mixture in a total weight of 25.1 parts by weight containing 0.1 part by weight of a solution in 70% by weight concentration of bis(dimethylaminoethyl) ether as the catalyst {manufactured by Kao Corporation under the trade name "Kaolizer No. 12"} in dipropylene glycol and 2.5 parts by weight of reactive silicone as a foam stabilizer in which 70% by weight of ether chain consisted of polyoxyethylene, said solution and said foam stabilizer being dissolved in 22.5 parts by weight of water. The mixture thus obtained was poured in a foaming chamber without any lid measuring 300 mm×150 mm×50 mm in size, where it was foamed, and thereafter cured at 100° C. over a period of 15 minutes to prepare polyurethane foam.

The resultant foam was overwhelmed by closed cells, and shrinked with the lapse of cooling time, causing deformation. In order to prevent the shrinkage, an attempt was made to carry out crushing of the foam with a result that crushing was impossible because of the overwhelming closed cells. The foam, when further strongly pressed, was finally broken making it impossible to obtain normal polyurethane foam which is usable for a roller.

COMPARATIVE EXAMPLE 4

Into an enclosable vessel were weighed 60 parts by weight of polymer polyol having about 28% by weight of solid content (acrylonitrile/styrene polymer) composed, as a base polyol, of polyether polyol which had a weight average molecular weight of 5000 and which had been produced by the addition to glycerol, of 15% by weight of ethylene oxide and 85% by weight of propylene oxide; 40 parts by weight of polyether polyol which had a weight average molecular weight of 4800 and which had been produced by the addition to glycerol, of 15% by weight of ethylene oxide and 85% by weight of propylene oxide; and 19 parts by weight of tolylene diisocyanate (TDI-80). The vessel was closed with a lid and shaken, so that the content therein was sufficiently mixed. Thereafter, the vessel was placed in an oven at 60° C. of hot air circulation type, sometimes taken out from the oven, shaken to mix the content therein and heated for 48 hours to synthesize a prepolymer. The resultant prepolymer had an NCO content of 6.1% by weight.

Subsequently, by the use of a high speed mixer, a mixture was prepared by mixing 100 parts by weight of the resultant prepolymer and the mixture in a total weight of 25.1 parts by weight containing 0.1 part by weight of a solution in 70% by weight concentration of bis(dimethylaminoethyl) ether as the catalyst {manufactured by Kao Corporation under the trade name "Kaolizer No. 12"} in dipropylene glycol and 2.5 parts by weight of reactive silicone as a foam stabilizer in which 70% by weight of ether chain consisted of polyoxyethylene, said solution and said foam stabilizer being dissolved in 22.5 parts by weight of water. The mixture thus obtained was poured in a foaming chamber without any lid measuring 300 mm×150 mm×50 mm in size, where it was foamed, and thereafter cured at 100° C. over a period of 15 minutes to prepare polyurethane foam. The foam thus obtained was processed in the same manner as in Example 1 to prepare a polyurethane foam made roller having an outer diameter of 13.4 mm and a length of polyurethane foam portion of 217 mm.

The polyurethane foam portion of the resultant roller had a density of 0.118 g/cm$^3$, the number of cells per 25 mm length of the polyurethane foam being 56, a residual compressive strain of 6.4%, a tensile strength of 0.151 MPa, a roller resistance at 20° C. and at a relative humidity of 50% being $10^{11.02}$ Ω and an Asker F hardness of 87 degrees, in which the cell sizes were unreasonably large as compared with those of the objective polyurethane foam, and the hardness was excessively high.

The roller was integrated in a dry type electrophotographic apparatus to serve as a toner feeding roller, and allowed to stand under a low temperature low humidity condition (15° C. and 10%) and also under a high temperature high humidity condition (32.5° C. and 85%) each for 48 hours. Thereafter both white solid images and black solid images were printed. As a result, there were generated uneven images presumably due to coarse cells in each of the conditions.

EXAMPLE 5

Into an enclosable vessel were weighed 20 parts by weight of polymer polyol having about 28% by weight of solid content (acrylonitrile/styrene polymer) composed, as a base polyol, of polyether polyol which had a weight average molecular weight of 5000 and which had been produced by the addition to glycerol, of 15% by weight of ethylene oxide and 85% by weight of propylene oxide; 40 parts by weight of hydrophilic polyether polyol which had a weight average molecular weight of 3400 and which had been produced by the addition to glycerol, of 75% by weight of ethylene oxide and 25% by weight of propylene oxide; 40 parts by weight of polyether polyol which had a weight average molecular weight of 4800 and which had been produced by the addition to glycerol, of 15% by weight of ethylene oxide and 85% by weight of propylene oxide; and 21 parts by weight of tolylene diisocyanate (TDI-80). The vessel was closed with a lid and shaken, so that the content therein was sufficiently mixed. Thereafter, the vessel was placed in an oven at 60° C. of hot air circulation type, sometimes taken out from the oven, shaken to mix the content therein and heated for 48 hours to synthesize a prepolymer. The resultant prepolymer had an NCO content of 6.0% by weight.

Subsequently, by the use of a high speed mixer, a mixture was prepared by mixing 100 parts by weight of the resultant prepolymer and the mixture in a total weight of 29.6 parts by weight containing 0.1 part by weight of a solution in 70% by weight concentration of bis(dimethylaminoethyl) ether as the catalyst {manufactured by Kao Corporation under the trade name "Kaolizer No. 12"} in dipropylene glycol and 2.5 parts by weight of reactive silicone as a foam stabilizer in which 70% by weight of ether chain consisted of polyoxyethylene, said solution and said foam stabilizer being dissolved in 27 parts by weight of an aqueous dispersion of carbon containing electroconductive carbon (manufactured by Lion Corporation under the trade name "Lion Paste W311N"). The mixture thus obtained was poured in a foaming chamber without any lid measuring 300 mm×150 mm×50 mm in size, where it was foamed, and then cured at 100° C. over a period of 15 minutes to prepare electroconductive polyurethane foam. The foam thus obtained was cut into a piece measuring 28 mm×28 mm×240 mm in size by the use of a vertical cutter, and in the central part of the plane with 28 mm×28 mm in size, there was made a through hole having a diameter of 5.0 mm perpendicularly to the plane. Then a shaft of 6.0 mm in diameter which had been made of galvanized sulfur free cutting steel and wrapped with a hot melt sheet on the outside surface was inserted into the through hole. The foam with the shaft was heated for 70 minutes in an oven at 120° C. of hot air circulation type so as to adhere the shaft to the foam. The resultant electroconductive shafted polyurethane foam was polished by the use of a polishing machine, and both the ends of the foam was cut off to prepare an electroconductive polyurethane foam made roller having an outer diameter of 13.4 mm and a length of polyurethane foam portion of 217 mm.

The electroconductive polyurethane foam portion of the resultant roller had a density of 0.106 g/cm$^3$, the number of cells per 25 mm length of the polyurethane foam being 112, a residual compressive strain of 3.8%, a tensile strength of 0.162 MPa, a roller resistance at 20° C. and at a relative humidity of 50% being $10^{4.40}$ Ω and an Asker F hardness of 50 degrees, whereby suitable characteristics were obtained in all respects.

The roller was integrated in a dry type electrophotographic apparatus to serve as a toner feeding roller, and allowed to stand under a low temperature low humidity condition (15° C. and 10%) and also under a high temperature high humidity condition 32.5° C. and 85%) each for 48 hours. Thereafter both white solid images and black solid images were printed. As a result, satisfactory images were obtained.

EXAMPLE 6

Into an enclosable vessel were weighed 40 parts by weight of polymer polyol having about 28% by weight of solid content (acrylonitrile/styrene polymer) composed, as a base polyol, of polyether polyol which had a weight average molecular weight of 5000 and which had been produced by the addition to glycerol, of 15% by weight of ethylene oxide and 85% by weight of propylene oxide; 60 parts by weight of hydrophilic polyether polyol which had a weight average molecular weight of 3400 and which had been produced by the addition to glycerol, of 75% by weight of ethylene oxide and 25% by weight of propylene oxide; and 21 parts by weight of tolylene diisocyanate (TDI-80). The vessel was closed with a lid and shaken, so that the content therein was sufficiently mixed. Thereafter, the vessel was placed in an oven at 60° C. of hot air circulation type, sometimes taken out from the oven, shaken to mix the content therein and heated for 48 hours to synthesize a prepolymer. The resultant prepolymer had an NCO content of 6.0% by weight.

Subsequently, by the use of a high speed mixer, a mixture was prepared by mixing 100 parts by weight of the resultant prepolymer and the mixture in a total weight of 29.6 parts by weight containing 0.1 part by weight of a solution in 70% by weight concentration of bis (dimethylaminoethyl) ether as the catalyst {manufactured by Kao Corporation under the trade name "Kaolizer No. 12"} in dipropylene glycol and 2.5 parts by weight of reactive silicone as a foam stabilizer in which 70% by weight of ether chain consisted of polyoxyethylene, said solution and said foam stabilizer being dissolved in 27 parts by weight of an aqueous dispersion of carbon containing electroconductive carbon (manufactured by Lion Corporation under the trade name "Lion Paste W311N"). The mixture thus obtained was poured in a foaming chamber without any lid measuring 300 mm×150 mm×50 mm in size, where it was foamed, and then cured at 100° C. over a period of 15 minutes to prepare electroconductive polyurethane foam. The foam thus obtained was processed in the same manner as in Example 5 to prepare an electroconductive polyurethane foam made roller having an outer diameter of 13.4 mm and a length of electroconductive polyurethane foam portion of 217 mm.

The electroconductive polyurethane foam portion of the resultant roller had a density of 0.073 g/cm$^3$, the number of cells per 25 mm length of the electroconductive polyurethane foam being 117, a residual compressive strain of 6.8%, a tensile strength of 0.173 MPa, a roller resistance at 20° C. and at a relative humidity of 50% being $10^{4.80}$ Ω and an Asker F hardness of 33 degrees, whereby suitable characteristics were obtained in all respects.

The roller was integrated in a dry type electrophotographic apparatus to serve as a toner feeding roller, and allowed to stand under a low temperature low humidity condition (15° C. and 10%) and also under a high temperature high humidity condition 32.5° C. and 85%) each for 48 hours. Thereafter both white solid images and black solid images were printed. As a result, satisfactory images were obtained.

EXAMPLE 7

By the use of the mixture same as that in Example 5, electroconductive polyurethane foam was prepared through pressurized mold method. Specifically, by using a pressurized mold made of aluminum without a vent hole in which a rubbery packing was used on the ground portion between a top force and the bottom force, and the inner size was 50 mm×50 mm×300 mm, the above-mentioned mixture was poured in the pressurized mold where it was foamed, and thereafter cured at 100° C. over a period of 15 minutes to prepare electroconductive polyurethane foam. The foam thus obtained was processed in the same manner as in Example 5 to prepare an electroconductive polyurethane foam made roller having an outer diameter of 13.4 mm and a length of polyurethane foam portion of 217 mm.

The electroconductive polyurethane foam portion of the resultant roller had a density of 1.36 g/cm$^3$, the number of cells per 25 mm length of the polyurethane foam being 155, a residual compressive strain of 8.7%, a tensile strength of 0.192 MPa, a roller resistance at 20° C. and at a relative humidity of 50% being $10^{4.23}$ Ω and an Asker F hardness of 74 degrees, whereby suitable characteristics were obtained in all respects.

The electroconductive roller was integrated in a dry type electrophotographic apparatus to serve as a toner feeding roller, and allowed to stand under a low temperature low humidity condition (15° C. and 10%) and also under a high temperature high humidity condition (32.5° C. and 85%) each for 48 hours. Thereafter both white solid images and black solid images were printed. As a result, satisfactory images were obtained.

EXAMPLE 8

By the use of the mixture same as that in Example 6 in the same manner as in Example 7, electroconductive polyurethane foam was prepared through pressurized mold method. The foam thus obtained was processed in the same manner as in Example 5 to prepare an electroconductive polyurethane foam made roller having an outer diameter of 13.4 mm and a length of polyurethane foam portion of 217 mm.

The electroconductive polyurethane foam portion of the resultant roller had a density of 1.07 g/cm$^3$, the number of cells per 25 mm length of the polyurethane foam being 183, a residual compressive strain of 9.2%, a tensile strength of 0.204 MPa, a roller resistance at 20° C. and at a relative humidity of 50% being $10^{4.58}$ Ω and an Asker F hardness of 58 degrees, whereby suitable characteristics were obtained in all respects.

The electroconductive roller was integrated in a dry type electrophotographic apparatus to serve as a toner feeding roller, and allowed to stand under a low temperature low humidity condition (15° C. and 10%) and also under a high temperature high humidity condition (32.5° C. and 85%) each for 48 hours. Thereafter both white solid images and black solid images were printed. As a result, satisfactory images were obtained.

COMPARATIVE EXAMPLE 5

Into an enclosable vessel were weighed 100 parts by weight of polyether polyol which had a weight average molecular weight of 4800 and which had been produced by the addition to glycerol, of 15% by weight of ethylene oxide and 85% by weight of propylene oxide; and 22.2 parts by weight of tolylene diisocyanate (TDI-80). The vessel was closed with a lid and shaken, so that the content therein was sufficiently mixed. Thereafter, the vessel was placed in an oven at 60° C. of hot air circulation type, sometimes taken out from the oven, shaken to mix the content therein and heated for 48 hours to synthesize a prepolymer. The resultant prepolymer had an NCO content of 6.1% by weight.

Subsequently, by the use of a high speed mixer, a mixture was prepared by mixing 100 parts by weight of the resultant prepolymer and the mixture in a total weight of 30.1 parts by weight containing 0.1 part by weight of a solution in 70% by weight concentration of bis(dimethylaminoethyl) ether as the catalyst {manufactured by Kao Corporation under the trade name "Kaolizer No. 12"} in dipropylene glycol and 2.5 parts by weight of reactive silicone as a foam stabilizer in which 70% by weight of ether chain consisted of polyoxyethylene, said solution and said foam stabilizer being dissolved in 27 parts by weight of an aqueous dispersion of carbon containing electroconductive carbon (manufactured by Lion Corporation under the trade name "Lion Paste W311N"). The mixture thus obtained was poured in a foaming chamber without any lid measuring 300 mm×300 mm×70 mm in size, where it was foamed, and then cured at 100° C. over a period of 15 minutes to prepare electroconductive polyurethane foam. The foam thus obtained was processed in the same manner as in Example 5 to prepare an electroconductive polyurethane foam made roller having an outer diameter of 13.4 mm and a length of polyurethane foam portion of 217 mm.

The electroconductive polyurethane foam portion of the resultant roller had a density of 0.089 g/cm$^3$, the number of cells per 25 mm length of the polyurethane foam being 81, a residual compressive strain of 7.7%, a tensile strength of 0.168 MPa, a roller resistance at 20° C. and at a relative humidity of 50% being $10^{5.20}$ Ω and an Asker F hardness of 56 degrees, in which the residual compressive strain was favorably low, but the cell sizes were unreasonably large.

The roller was integrated in a dry type electrophotographic apparatus to serve as a toner feeding roller, and allowed to stand under a low temperature low humidity condition (15° C. and 10%) and also under a high temperature high humidity condition (32.5° C. and 85%) each for 48 hours. Thereafter both white solid images and black solid images were printed. As a result, there were generated uneven images presumably due to coarse cells in each of the conditions.

COMPARATIVE EXAMPLE 6

Into an enclosable vessel were weighed 100 parts by weight of hydrophilic polyether polyol which had a weight average molecular weight of 3400 and which had been produced by the addition to glycerol, of 75% by weight of ethylene oxide and 25% by weight of propylene oxide; and 23 parts by weight of tolylene diisocyanate (TDI-80). The vessel was closed with a lid and shaken, so that the content therein was sufficiently mixed. Thereafter, the vessel was placed in an oven at 60° C. of hot air circulation type, sometimes taken out from the oven, shaken to mix the content therein and heated for 48 hours to synthesize a prepolymer. The resultant prepolymer had an NCO content of 5.9% by weight.

Subsequently, by the use of a high speed mixer, a mixture was prepared by mixing 100 parts by weight of the resultant prepolymer and the mixture in a total weight of 29.6 parts by weight containing 0.1 part by weight of a solution in 70% by weight concentration of bis (dimethylaminoethyl) ether as the catalyst {manufactured by Kao Corporation under the trade name "Kaolizer No. 12"} in dipropylene glycol and 2.5 parts by weight of reactive silicone as a foam stabilizer in which 70% by weight of ether chain consisted of polyoxyethylene, said solution and said foam stabilizer being dissolved in 27 parts by weight of an aqueous dispersion of carbon containing electroconductive carbon (manufactured by Lion Corporation under the trade name "Lion Paste W311N"). The mixture thus obtained was poured in a foaming chamber without any lid measuring 300 mm×150 mm×50 mm in size, where it was foamed, and then cured at 100° C. over a period of 15 minutes to prepare electroconductive polyurethane foam.

The resultant foam was overwhelmed by closed cells, and shrinked with the lapse of cooling time, causing deformation. In order to prevent the shrinkage, an attempt was made to carry out crushing of the foam with a result that crushing was impossible because of the overwhelming closed cells. The foam, when further strongly pressed, was finally broken making it impossible to obtain normal polyurethane foam which is usable for a roller.

COMPARATIVE EXAMPLE 7

Into an enclosable vessel were weighed 60 parts by weight of hydrophilic polyether polyol which had a weight average molecular weight of 3400 and which had been produced by the addition to glycerol, of 75% by weight of ethylene oxide and 25% by weight of propylene oxide; 40 parts by weight of polyether polyol which had a weight average molecular weight of 4800 and which had been produced by the addition to glycerol, of 15% by weight of ethylene oxide and 85% by weight of propylene oxide; and 21 parts by weight of tolylene diisocyanate (TDI-80). The vessel was closed with a lid and shaken, so that the content therein was sufficiently mixed. Thereafter, the vessel was placed in an oven at 60° C. of hot air circulation type, sometimes taken out from the oven, shaken to mix the content therein and heated for 48 hours to synthesize a prepolymer. The resultant prepolymer had an NCO content of 6.0% by weight.

Subsequently, by the use of a high speed mixer, a mixture was prepared by mixing 100 parts by weight of the resultant prepolymer and the mixture in a total weight of 29.6 parts by weight containing 0.1 part by weight of a solution in 70% by weight concentration of bis(dimethylaminoethyl) ether as the catalyst {manufactured by Kao Corporation under the trade name "Kaolizer No. 12"} in dipropylene glycol and 2.5 parts by weight of reactive silicone as a foam stabilizer in which 70% by weight of ether chain consisted of polyoxyethylene, said solution and said foam stabilizer being dissolved in 27 parts by weight of an aqueous dispersion of carbon containing electroconductive carbon (manufactured by Lion Corporation under the trade name "Lion Paste W311N"). The mixture thus obtained was poured in a foaming chamber without any lid measuring 300 mm×150 mm×50 mm in size, where it was foamed, and then cured at 100° C. over a period of 15 minutes to prepare electroconductive polyurethane foam.

The resultant electroconductive foam was overwhelmed by closed cells, and shrinked with the lapse of cooling time, causing deformation. In order to prevent the shrinkage, an attempt was made to carry out crushing of the foam with a result that crushing was impossible because of the overwhelming closed cells. The foam, when further strongly pressed, was finally broken making it impossible to obtain normal polyurethane foam which is usable for a roller.

COMPARATIVE EXAMPLE 8

Into an enclosable vessel were weighed 60 parts by weight of polymer polyol having about 28% by weight of solid content (acrylonitrile/styrene polymer) composed, as a base polyol, of polyether polyol which had a weight average molecular weight of 5000 and which had been produced by the addition to glycerol, of 15% by weight of ethylene oxide and 85% by weight of propylene oxide; 40 parts by weight of polyether polyol which had a weight average molecular weight of 4800 and which had been produced by the addition to glycerol, of 15% by weight of ethylene oxide and 85% by weight of propylene oxide; and 19 parts by weight of tolylene diisocyanate (TDI-80). The vessel was closed with a lid and shaken, so that the content therein was sufficiently mixed. Thereafter, the vessel was placed in an oven at 60° C. of hot air circulation type, sometimes taken out from the oven, shaken to mix the content therein and heated for 48 hours to synthesize a prepolymer. The resultant prepolymer had an NCO content of 6.1% by weight, which was almost targeted value.

Subsequently, by the use of a high speed mixer, a mixture was prepared by mixing 100 parts by weight of the resultant prepolymer and the mixture in a total weight of 29.6 parts by weight containing 0.1 part by weight of a solution in 70% by weight concentration of bis (dimethylaminoethyl) ether as the catalyst {manufactured by Kao Corporation under the trade name "Kaolizer No. 12"} in dipropylene glycol and 2.5 parts by weight of reactive silicone as a foam stabilizer in which 70% by weight of ether chain consisted of polyoxyethylene, said solution and said foam stabilizer being dissolved in 27 parts by weight of an aqueous dispersion of carbon containing electroconductive carbon (manufactured by Lion Corporation under the trade name "Lion Paste W311N"). The mixture thus obtained was poured in a foaming chamber without any lid measuring 300 mm×150 mm×50 mm in size, where it was foamed, and then cured at 100° C. over a period of 15 minutes to prepare electroconductive polyurethane foam. The foam thus obtained was processed in the same manner as in Example 5 to prepare an electroconductive polyurethane foam made roller having an outer diameter of 13.4 mm and a length of polyurethane foam portion of 217 mm.

The electroconductive polyurethane foam portion of the resultant roller had a density of 0.122 g/cm$^3$, the number of cells per 25 mm length of the polyurethane foam being 58, a residual compressive strain of 6.6%, a tensile strength of 0.159 MPa, a roller resistance at 20° C. and at a relative humidity of 50% being $10^{5.40}$ Ω and an Asker F hardness of 87 degrees, in which the cell sizes were unreasonably large as compared with those of the objective electroconductive polyurethane foam, and the hardness was excessively high.

The roller was integrated in a dry type electrophotographic apparatus to serve as a toner feeding roller, and allowed to stand under a low temperature low humidity condition (15° C. and 10%) and also under a high temperature high humidity condition 32.5° C. and 85%) each for 48 hours. Thereafter both white solid images and black solid images were printed. As a result, there were generated uneven images presumably due to coarse cells in each of the conditions.

What is claimed is:

1. An elastic member constituted of polyurethane foam obtained by agitationally mixing with water, a urethane prepolymer synthesized from a polyol and a polyisocyanate, characterized by simultaneously employing as polyols, a (A) polymer polyol synthesized from a polyether polyol as a basis, comprising at least 70% by weight of oxypropylene moiety; and a (B) hydrophilic polyether polyol comprising at least 50% by weight of oxyethylene moiety, or simultaneously employing as polyols, a (A) polymer polyol synthesized from a polyether polyol as a basis, comprising at least 70% by weight of oxypropylene moiety;

a (B) hydrophilic polyether polyol comprising at least 50% by weight of oxyethylene moiety; and a (C) polyether polyol comprising at least 70% by weight of oxypropylene moiety.

2. The elastic member according to claim 1, wherein the polymer polyol (A) comprises 75 to 100% by weight of oxypropylene moiety, the hydrophilic polyether polyol (B) comprises 60 to 100% by weight of oxyethylene moiety, and the polyether polyol (C) comprises 75 to 100% by weight of oxypropylene moiety.

3. The elastic member according to claim 1, wherein the polymer polyol (A), the hydrophilic polyether polyol(B) and the polyether polyol (C) are employed at blending proportions of 3 to 80% by weight of (A), 20 to 60% by weight of (B) and 0 to 60% by weight of (C).

4. The elastic member according to claim 1, wherein the urethane prepolymer and water are agitationally mixed in the presence of a catalyst and a foam stabilizer.

5. The elastic member according to claim 4, wherein the foam stabilizer comprises a polyether-modified silicone wherein the polyether moiety therein contains at least 60% by weight of oxyethylene moiety.

6. The elastic member according to claim 1, wherein said member is in the form of a roller which has an electric resistance (Ω) expressed in terms of logarithmic value {log Ω} being at least 9.0, an Asker F hardness in the range of 40 to 85 degrees, the number of cells per 25 mm length of polyurethane foam in the range of 50 to 200, a residual compressive strain in the range of 1 to 10% and a tensile strength in the range of 0.15 to 0.50 MPa.

7. The elastic member according to claim 1, wherein said member constitutes a developer feeding roller or a transfer roller that are used for image formation equipment.

8. Image formation equipment which is equipped with the elastic member as set forth in claim 1.

9. A toiletry or a bathing product which comprises a polyurethane foam obtained by agitationally mixing with water, an urethane prepolymer synthesized from a polyol and a polyisocyanate, said polyol comprising (A) a polymer polyol synthesized from a polyester polyol comprising at least 70% by weight of oxypropylene moiety as a basis and (B) a hydrophilic polyether polyol comprising at least 50% by weight oxyethylene moiety;

or comprising (A) a polymer polyol synthesized from a polyester polyol comprising at least 70% by weight of oxypropylene moiety as a basis, (B) a hydrophilic polyether polyol comprising at least 50% by weight oxyethylene moiety, and (C) a polyether polyol comprising at least 70% by weight of oxypropylene moiety.

10. An electroconductive elastic member constituted of polyurethane foam obtained by agitationally mixing with an aqueous dispersion of carbon, a urethane prepolymer synthesized from a polyol and a polyisocyanate, characterized by simultaneously employing as polyols, a (A) polymer polyol synthesized from a polyether polyol as a basis, comprising at least 70% by weight of oxypropylene moiety; and a (B) hydrophilic polyether polyol comprising at least 50% by weight of oxyethylene moiety, or simultaneously employing as polyols, a (A) polymer polyol synthesized from a polyether polyol as a basis, comprising at least 70% by weight of oxypropylene moiety;

a (B) hydrophilic polyether polyol comprising at least 50% by weight of oxyethylene moiety; and a (C) polyether polyol comprising at least 70% by weight of oxypropylene moiety.

11. The electroconductive elastic member according to claim 10, wherein the polymer polyol (A) comprises 75 to 100% by weight of oxypropylene moiety, the hydrophilic polyether polyol (B) comprises 60 to 100% by weight of oxyethylene moiety, and the polyether polyol (C) comprises 75 to 100% by weight of oxypropylene moiety.

12. The electroconductive elastic member according to claim 10, wherein the polymer polyol (A), the hydrophilic polyether polyol (B) and the polyether polyol (C) are employed at blending proportions of 3 to 80% by weight of (A), 20 to 60% by weight of (B) and 0 to 60% by weight of (C).

13. The electroconductive elastic member according to claim 10, wherein the aqueous dispersion of carbon comprises 5 to 20% by weight of carbon black.

14. The electroconductive elastic member according to claim 10, wherein the chemical equivalent ratio of NCO group in the urethane prepolymer/OH group in water contained in the aqueous dispersion of carbon is 2/100 to 10/100.

15. The electroconductive elastic member according to claim 10, wherein the urethane prepolymer and aqueous dispersion of carbon are agitationally mixed in the presence of a catalyst and a foam stabilizer.

16. The electroconductive elastic member according to claim 15, wherein the foam stabilizer comprises a polyether-modified silicone wherein the polyether moiety therein contains at least 60% by weight of oxyethylene moiety.

17. The electroconductive elastic member according to claim 10, wherein said member is in the form of a roller which has an electric resistance ($\Omega$) expressed in terms of logarithmic value $\{\log \Omega\}$ in the range of 3.0 to 6.0, an Asker F hardness in the range of 40 to 85 degrees, the number of cells per 25 mm length of polyurethane foam in the range of 50 to 200, a residual compressive strain in the range of 1 to 10% and a tensile strength in the range of 0.15 to 0.50 MPa.

18. The electroconductive elastic member according to claim 10, wherein said member constitutes a developer feeding roller or a transfer roller that are used for image formation equipment.

19. Image formation equipment which is equipped with the electroconductive elastic member as set forth in claim 10.

* * * * *